(12) United States Patent
Brunnegard et al.

(10) Patent No.: US 12,194,950 B2
(45) Date of Patent: Jan. 14, 2025

(54) SEATBELT DEVICE AND DETECTION METHOD

(71) Applicant: AUTOLIV DEVELOPMENT AB, Vargarda (SE)

(72) Inventors: Niklas Brunnegard, Sollebrunn (SE); Linus Larsson, Alingsas (SE); Elias Mathiasson, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/562,691

(22) PCT Filed: May 5, 2022

(86) PCT No.: PCT/EP2022/062168
§ 371 (c)(1),
(2) Date: Nov. 20, 2023

(87) PCT Pub. No.: WO2022/248185
PCT Pub. Date: Dec. 1, 2022

(65) Prior Publication Data
US 2024/0208456 A1 Jun. 27, 2024

(30) Foreign Application Priority Data
May 25, 2021 (DE) ..................... 10 2021 113 463.3

(51) Int. Cl.
*B60R 22/18* (2006.01)
*B60R 22/02* (2006.01)
*B60R 22/48* (2006.01)

(52) U.S. Cl.
CPC ............ *B60R 22/023* (2013.01); *B60R 22/18* (2013.01); *B60R 22/48* (2013.01);
(Continued)

(58) Field of Classification Search
CPC ....... B60R 22/02; B60R 22/023; B60R 22/18; B60R 22/48; B60R 2022/026;
(Continued)

(56) References Cited

U.S. PATENT DOCUMENTS 3,369,842 A * 2/1968 Adams ............... A44B 11/2549
24/DIG. 30
3,542,426 A * 11/1970 Radke ................ A44B 11/2549
24/165

(Continued)

FOREIGN PATENT DOCUMENTS

DE 102006039129 A1 3/2008
DE 102010029790 A1 * 12/2011 ............. B60R 22/48

*Primary Examiner* — Keith J Frisby
(74) *Attorney, Agent, or Firm* — DICKINSON WRIGHT PLLC

(57) ABSTRACT

A seatbelt device for a motor vehicle, including: a diagonal belt portion and a lap belt portion, each of which is connected to a seatbelt retractor that can be fixedly secured to the vehicle, a seatbelt buckle that can be fixedly secured to the vehicle, and a seatbelt tongue that can be locked to the seatbelt buckle. One end of the lap belt portion is secured to the seatbelt tongue, and one end of the diagonal belt portion is secured to a fitting, the fitting being rotatably connected to the seatbelt tongue. At least one sensor is provided and designed to detect the rotational angular position of the fitting with respect to the seatbelt tongue and/or the seatbelt buckle. The invention further relates to a corresponding method.

13 Claims, 4 Drawing Sheets

(52) U.S. Cl.
CPC ............... *B60R 2022/1812* (2013.01); *B60R 2022/4808* (2013.01); *B60R 2022/485* (2013.01)

(58) Field of Classification Search
CPC .... B60R 2022/1812; B60R 2022/4808; B60R 2022/485; A44B 11/25; A44B 11/2553; A44B 11/2561; Y10T 24/45084
USPC ............... 280/801.1, 807, 808; 297/483; 24/579.11
See application file for complete search history.

(56) References Cited

U.S. PATENT DOCUMENTS

| | | | | |
|---|---|---|---|---|
| 3,600,768 | A * | 8/1971 | Romanzi | A44B 11/2511 297/483 |
| 3,790,209 | A * | 2/1974 | Littmann | A44B 11/2549 297/483 |
| 3,790,994 | A * | 2/1974 | Jakob | A44B 11/2549 297/483 |
| 3,921,262 | A * | 11/1975 | Tanaka | A44B 11/2511 24/637 |
| 4,915,413 | A | 4/1990 | Meyer | |
| 6,334,628 | B1 * | 1/2002 | Newball | B60R 22/34 297/483 |
| 10,464,521 | B2 * | 11/2019 | Jaradi | B60R 22/18 |

* cited by examiner

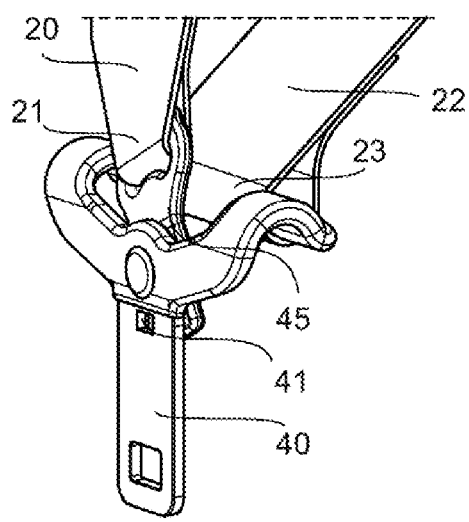
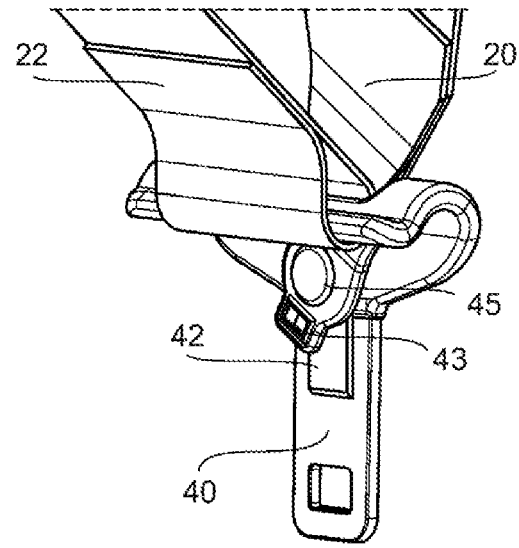
Fig. 5     Fig. 6
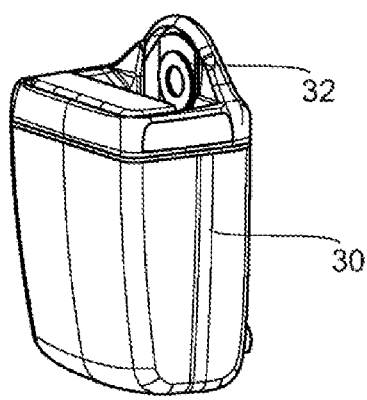
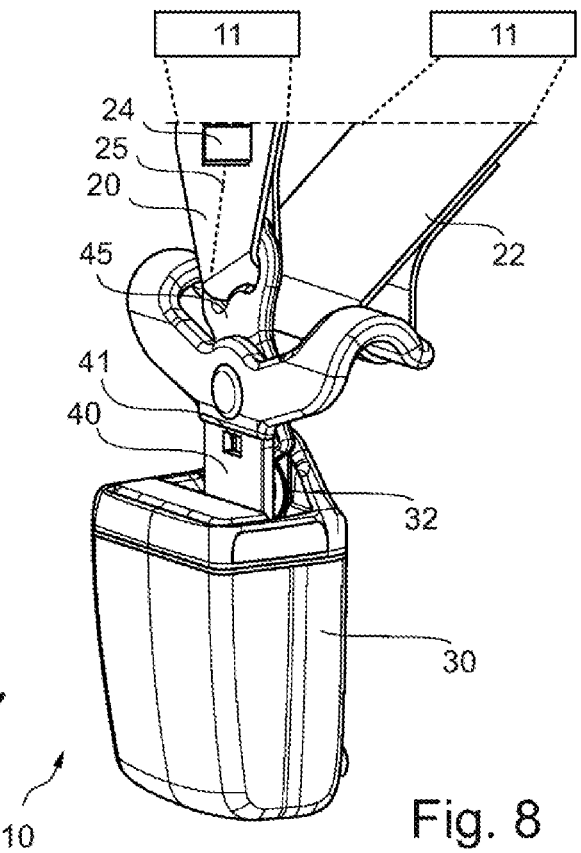
Fig. 7     Fig. 8

SEATBELT DEVICE AND DETECTION METHOD

CROSS-REFERENCE TO RELATED APPLICATIONS

This application is a 35 U.S.C. § 371 national phase of PCT International Application No. PCT/EP2022/062168, filed May 5, 2022, which claims the benefit of priority under 35 U.S.C. § 119 to German Patent Application No. 10 2021 113 463.3, filed May 25, 2021, the contents of which are incorporated herein by reference in its entirety.

FIELD OF THE INVENTION

The present invention relates to a seatbelt device for a motor vehicle and to a detection method having such a seatbelt device.

BACKGROUND

In motor vehicles, 3-point belts are used to increase occupant safety and to be able to ensure that the occupant is restrained. In modern vehicles, various systems are known which recognize an occupancy of a seat by an occupant and which detect when the seatbelt is fastened by inserting the seatbelt tongue. Nevertheless, an occupant may consciously or unconsciously fasten the seatbelt incorrectly. This applies in particular to the diagonal belt which can, for example, run in front of the abdomen but under the arm, or behind the back of an occupant which can have a negative impact on occupant safety.

The invention is based on the object of specifying a seatbelt device and a detection method for such a safety belt which enable detection of improper use of the seatbelt device.

SUMMARY AND INTRODUCTORY DESCRIPTION OF EXEMPLARY EMBODIMENTS

The present invention achieves the above-described object with the features described herein. A seatbelt device for a motor vehicle is proposed having a diagonal belt portion and a lap belt portion, each of which is connected to a seatbelt retractor that can be fixedly secured to the vehicle, a seatbelt buckle that can be fixedly secured to the vehicle, and a seatbelt tongue that can be locked to the seatbelt buckle to which one end of the lap belt portion is secured. One end of the diagonal belt portion is secured to a fitting, wherein the fitting is rotatably connected to the seatbelt tongue. At least one sensor is provided and designed to detect the rotational angular position of the fitting with respect to the seatbelt tongue and/or the seatbelt buckle.

It was recognized that the course of the diagonal belt portion can be derived from the detection of the angle of rotation of the fitting in relation to the seatbelt tongue and/or the seatbelt buckle, whereby misuse or improper use of the diagonal belt by an occupant can be detected. This allows other safety systems to be correspondingly adapted in a controlled manner and/or a warning to be issued. The at least one sensor is preferably a rotary encoder.

It is further proposed that at least one magnet is arranged on the fitting. The arrangement of a magnet on the fitting enables a measurement of the position, in particular of the rotational angular position, relative to a seatbelt tongue and/or a seatbelt buckle using the magnetic field generated by the magnet. It is further proposed that two magnets are provided on the fitting, between which a measurable magnetic field is formed. In possible embodiments, at least one magnet can be arranged on the seatbelt tongue and/or the seatbelt buckle.

It is further proposed that the sensor is a Hall sensor. A Hall sensor as the sensor enables a simple and economical determination of the rotational angular position of the fitting relative to the seatbelt tongue and/or the seatbelt buckle, wherein the Hall sensor generates an electrical signal which can be further processed particularly easily. This is particularly advantageous when arranging at least one magnet on the part of the seatbelt device that is movable relative to the sensor.

In an advantageous embodiment, it is proposed that the sensor is arranged on the seatbelt buckle. An arrangement of the sensor on the seatbelt buckle enables a simple electrical connection of the sensor to other vehicle systems in order to operate the sensor and to forward corresponding measurement signals, since the seatbelt buckle itself is or will be fixed to the vehicle so that the electrical connection does not have to be established via a detachable connection.

According to another development, it is proposed for the sensor to be arranged on the seatbelt tongue. An arrangement of the sensor on the seatbelt tongue is advantageous if, for example, the installation space on the seatbelt buckle is limited. Furthermore, the use of dummy seatbelt tongues for bypassing the seatbelt device is made more difficult.

It is further proposed that the seatbelt buckle and the seatbelt tongue each have an electrical coil for transmitting electrical energy. In this case, it is also advantageous to arrange the sensor on the seatbelt tongue to detect the rotation angle of the fitting in relation to the seatbelt tongue and/or the seatbelt buckle for better electromagnetic compatibility, which can also be supplied with electrical energy in this way.

According to another development, it is proposed that a cable connection is provided between the seatbelt tongue and an electronic module in the diagonal belt portion, wherein the seatbelt device is configured to transmit a sensor signal of the sensor via the cable connection to the electronic module in the diagonal belt portion. Preferably, the electronic module is configured to transmit the rotational angular position or the sensor signal detected by the sensor at the seatbelt tongue to another vehicle system. The electronic module therefore preferably comprises a radio unit for data transmission, for example according to the Bluetooth® standard. Accordingly, the detected rotational angular position can be transmitted as a signal for a categorization or the corresponding category and made available in a simple manner to other vehicle systems.

According to another development, it is proposed that the fitting is non-detachably connected to the seatbelt tongue. The non-detachable connection of the fitting eliminates the need to detect that the fitting is correspondingly fixed to the belt tongue. In addition, the region between the sensor and the magnet can always be kept covered to prevent contamination, in particular on the at least one magnet.

It is further proposed that a sensor is arranged on the fitting. This can be advantageous, for example, if electrical energy is available in the diagonal belt portion, for example for the operation of an electronic module, and can therefore be transmitted in a simple manner to the fitting connected to the diagonal belt.

The rotational angular position of the fitting, to which the diagonal belt portion is attached at one end, is, for example, detected continuously or at intervals.

The seatbelt buckle and the associated inserted seatbelt tongue are basically aligned identically. However, in different vehicles and/or seat rows, the seatbelt buckle can be installed in a different orientation, for example at an angle to the vehicle vertical axis about a vehicle transverse axis. Accordingly, the absolute value of the rotational angular position for the categorization can differ depending on the installation situation of the seatbelt device in a vehicle.

However, the principle of categorization remains unaffected by this, according to which a categorization into the first angular range takes place from a certain position of the rotatable fitting toward a backrest, which corresponds to a categorization as a "diagonal belt portion on the back." Starting at a certain position of the rotatable fitting relative to a seat surface, a categorization into the third angular range takes place, which corresponds to a categorization as a "diagonal belt portion on the abdomen and under the shoulder." In the angular range therebetween, a categorization in the second angular range is made in which proper use of the diagonal belt portion is assumed so that a categorization into the category of "diagonal belt portion on the abdomen and over the shoulder" takes place.

The first angular range, the second angular range and the third angular range adjoin one another, wherein the first angular range adjoins the second angular range, and the second angular range adjoins the third angular range. Accordingly, the second angular range is arranged between the first angular range and third angular range, so that in any case a clear categorization in the entire angular range of the first, second and third angular ranges is possible. The first angular range and the second angular range can be limited on the side facing away from the second angular range, for example by the measuring region of the sensor in the respective direction, or by a limited rotational mobility of the rotatable fitting relative to the seatbelt tongue.

In an exemplary installation situation, a value of 90° is assigned to the rotational angular position when the diagonal belt portion or the fitting is aligned parallel to the insertion axis of the seatbelt buckle and therefore also of the inserted seatbelt tongue. If, for example, the fitting is rotated upwards in the vehicle or rotated towards a seat backrest, the rotational angular position is assigned a corresponding value of less than 90°, i.e., a negative change in the rotation angle. An exemplary rotation of the fitting toward the floor plane of a vehicle or a seat surface accordingly results in the rotational angular position assuming a corresponding value greater than 90°, i.e., a positive change in the rotational angular position. Regardless of the absolute values, these signs are used below for the rotation direction.

In advantageous exemplary embodiments, the "diagonal belt portion on the back" category is assigned if the rotational angular position is, for example, <70° or further, for example, <60°, i.e., these rotational angular positions are in the first angular range. This corresponds, for example, to a rotation of the fitting relative to the seatbelt tongue and/or the seatbelt buckle of, for example, at least −20° or further, for example, at least −30° with respect to a parallel alignment.

In advantageous exemplary embodiments, the "diagonal belt portion on the abdomen and under the shoulder" category is assigned if the rotational angular position is for example, >81°, further for example >83°, even further for example >86°, i.e., these rotational angular positions are in the third angular range. This corresponds, for example, to a rotation of the fitting relative to the seatbelt tongue and/or to the seatbelt buckle of, for example, from −9 , or further for example from −7°, or even further for example from −4° relative to a parallel alignment.

In advantageous embodiments, an assignment to the category "diagonal belt portion on the abdomen and above the shoulder" is made if the rotational angular position is in the second angular range between the proposed limits for the assignment of "diagonal belt portion on the back" and "diagonal belt portion on the abdomen and below the shoulder." Accordingly, preferably two categories cannot be fulfilled simultaneously during the categorization.

The transmission of the signal, which can trigger a warning display and/or a warning signal, for example, takes place corresponding to the categorization of the detected rotational angular position. Furthermore, the signal can also trigger a changed function of a restraint system, for example a changed function of a belt tensioner or an airbag. In possible embodiments, the signal can correspond directly to the category and therefore to an angular range. Alternatively, the signal can, for example, signal incorrect use, i.e., the rotational angular position is in the first angular range or third angular range and therefore falls under one of the categories of "diagonal belt portion on the back" or "diagonal belt portion on the abdomen and under the shoulder," which corresponds to incorrect use.

According to another development of the detection method, the following steps are proposed:
 a) detecting an insertion of the seatbelt tongue into the seatbelt buckle;
 b) storing the rotational angular position when insertion has been detected as an adapted basic angular position;
 d1) categorizing a rotational angular position in the third angular range if the detected rotational angular position is greater than the basic angular position plus 5°.

In this way, the boundary between the second angular range and the third angular range can be adaptively adjusted to differentiate between the categories "diagonal belt portion on the abdomen and below the shoulder" and "diagonal belt portion on the abdomen and above the shoulder" depending on the physique of the occupant. In particular, borderline cases in a transitional range between the category of "diagonal belt portion on the abdomen and above the shoulder" and "diagonal belt portion on the abdomen and below the shoulder" can therefore be resolved by adaptively adjusting the limit for occupants of different sizes.

The basic angular position is detected for an occupant after detecting the insertion of the seatbelt tongue into the seatbelt buckle. The rotational angular position for storage as an adapted basic angular position can be detected, for example, directly with or after the detection of an insertion or after a short delay. It is assumed here that the occupant first normally buckles up with the diagonal belt portion in front of the abdomen and over the shoulder, and only then does a possible incorrect positioning of the diagonal belt portion under the shoulder occur.

Accordingly, based on the adapted basic angular position of the fitting, a categorization is made in the third angular range corresponding to "diagonal belt portion on the abdomen and under the shoulder" if the rotational angular position recorded in the further course of time has a greater value than the adapted basic angular position plus 5°. In this case, a diagonal belt portion under the shoulder is detected when the fitting is rotated 5° in the positive direction from the adapted basic angular position. In this way, borderline cases in an overlap region for different body sizes and shapes of a belted occupant can be compensated for.

According to another development, it is proposed that the rotational angular position when an insertion has been detected is stored as an adapted basic angular position only when the rotational angular position has a minimum size. A minimum size can be, for example, 70°. Accordingly, the minimum size would be undershot if the fitting is rotated from a parallel alignment with the seatbelt tongue or the seatbelt buckle, for example by more than 20° in a negative direction, i.e., upwards or toward a seat back.

This can prevent an insertion of the seatbelt tongue without occupants, or the diagonal belt behind the back from leading to an adapted basic angular position. The minimum size can, for example, also be the boundary between the first angular range and the second angular range.

In an advantageous embodiment, the possible adaptive region is limited upwards, i.e., the possible adapted basic angular position is limited to a value between 80° and 86°, for example. Accordingly, independent of the basic angular position, an assignment to the category of "diagonal belt portion on the abdomen and under the shoulder" is made when the rotational angular position is for example >86°. This corresponds, for example, to a rotation of the fitting relative to the seatbelt tongue and/or the seatbelt buckle of, for example, −4° or more in the positive direction relative to a parallel alignment. Accordingly, it is proposed that the possible shift of the boundary between the second angular range and the third angular range is limited in principle by the adapted basic angular position and the further rotation by 5°.

It is further proposed that the adapted basic angular position is reset when the seatbelt tongue is removed from the seatbelt buckle. This makes it easy to reset in the event of misuse.

BRIEF DESCRIPTION OF THE DRAWINGS

The invention is explained below using preferred embodiments with reference to the accompanying figures. In the figures:

FIG. 5 shows a seatbelt tongue with the rotatable fitting for a diagonal belt portion and a sensor;

FIG. 6 shows another view of a seatbelt tongue with the rotatable fitting for a diagonal belt portion and a sensor;

FIG. 7 shows a seatbelt buckle with an induction coil;

FIG. 8 shows a seatbelt device having a sensor for detecting a rotational angular position on the belt tongue.

DETAILED DESCRIPTION

Figure 1:
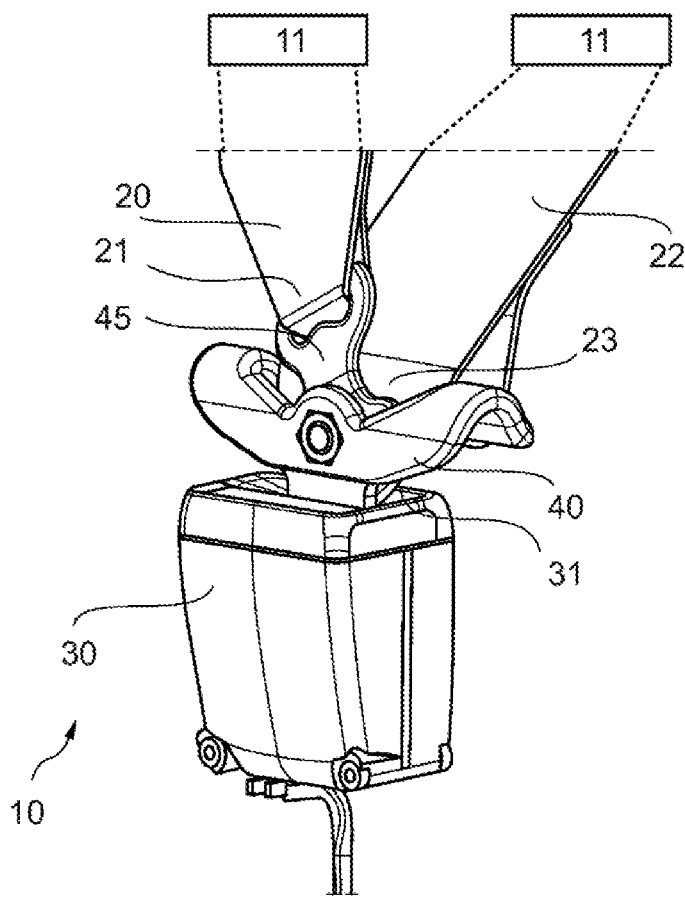
FIG. 1 shows a seatbelt device having a sensor for detecting a rotational angular position of a diagonal belt portion.

FIG. 1 shows an exemplary embodiment of a seatbelt device 10 for a motor vehicle. The seatbelt tongue 40 is inserted into a seatbelt buckle 30 fixable or fixed to the vehicle. A lap belt portion 22 is fastened to the seatbelt tongue 40 by an end 23 which is connected to a belt retractor 11 fixable or fixed to the vehicle. A rotatable, non-detachable (i.e., non-detachable without a tool) fitting 45 is provided on the seatbelt tongue 40, on which fitting 45 a diagonal belt portion 20 is connected to one end 21. The diagonal belt portion 20 is connected to another belt retractor 11 which is fixed or fixably connected to a vehicle. The seatbelt device 10 has a sensor 31 on the seatbelt buckle 30, see FIG. 2, which can detect the rotational angular position of the fitting 45 relative to the seatbelt buckle 30. Apart from the usual tolerances, the seatbelt buckle 30 and the inserted seatbelt tongue 40 are not rotatable relative to one another so that the rotational angular position of the fitting 45 relative to the seatbelt buckle 30 largely also corresponds to a rotational angular position of the fitting 45 relative to the inserted seatbelt tongue 40.

Figure 2:
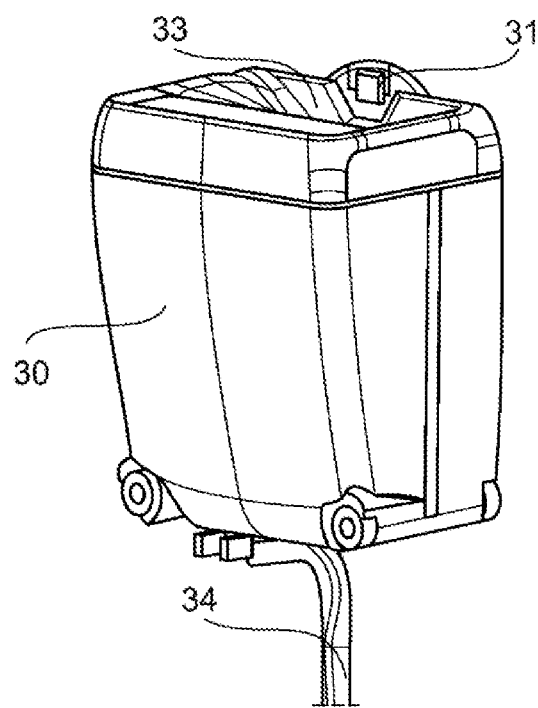
FIG. 2 shows a belt buckle with a sensor for detecting the rotational angular position of a diagonal belt portion.
Figure 3:
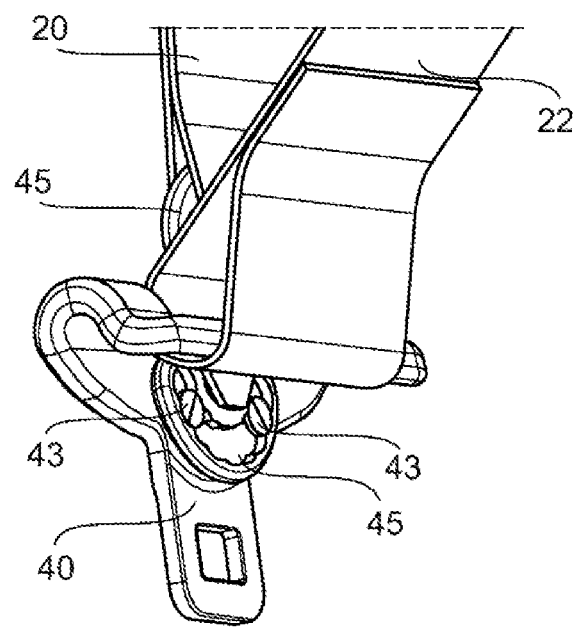
FIG. 3 shows a seatbelt tongue with the rotatable fitting for a diagonal belt portion.

FIG. 2 shows the seatbelt buckle 30 of FIG. 1 in an individual representation. In order to detect the rotational angular position of the fitting 45, the sensor 31 is arranged on the seatbelt buckle 30 to the side of an insertion opening 33 so that the sensor 31 is arranged in the immediate vicinity of the fitting 45 when the seatbelt tongue 40 is inserted. The side of the seatbelt tongue 40, which faces the sensor 31 on the seatbelt buckle 30, is shown in FIG. 3. In this embodiment, two cylindrical magnets 43 are embedded in the fitting 45 and are diametrically magnetized so that the north pole is not arranged at the top, but rather on the round side, and the south pole is arranged on the correspondingly opposite round side. The alignment of the magnets 43 can be seen in FIG. 3. The magnets 43 are rotated in tandem according to the rotational angular position of the fitting 45 on which they are arranged. In this embodiment, the sensor 31 is a Hall sensor and can detect the rotational angular position of the fitting relative to the seatbelt buckle 30 with the aid of the magnets 43.

Figure 4:
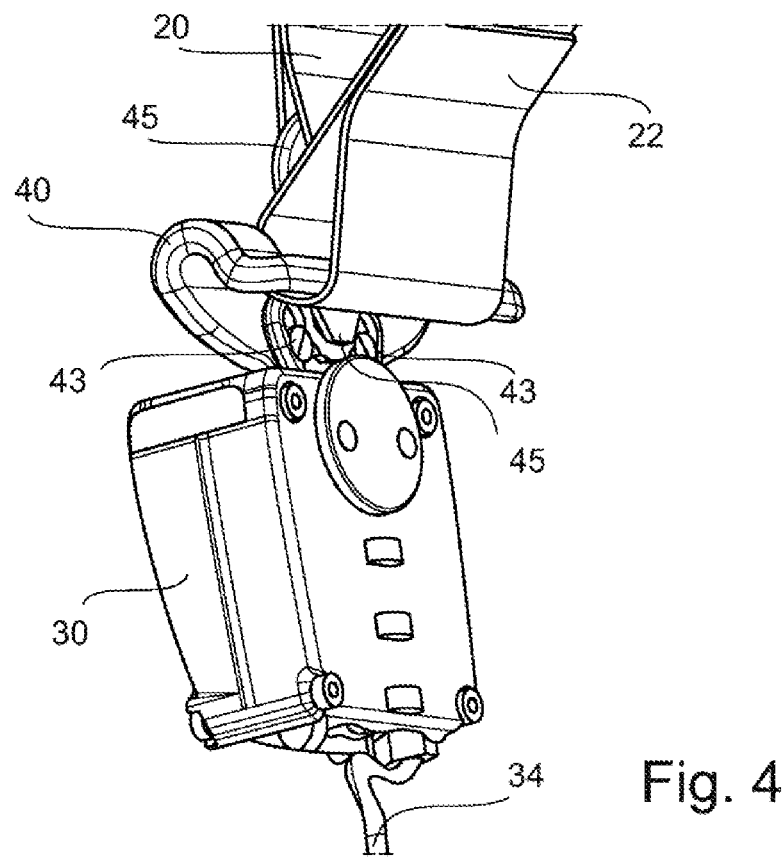
FIG. 4 shows another view of a seatbelt device having a sensor for detecting a rotational angular position of a diagonal belt portion.

In FIG. 4, the inserted seatbelt tongue 40 with the magnets 43 can be seen from the rear side, which is usually associated with a seat. The rotational angular position of the fitting 45 detected by the sensor 31 can be passed on by a cable 34 and categorized.

FIG. 5 shows another exemplary embodiment of a seatbelt tongue 40 of a seatbelt device 10. Deviating from the exemplary embodiment of FIGS. 1 to 4, a sensor 41 is arranged as a Hall sensor on the seatbelt tongue 40. Accordingly, the sensor 41 detects the rotational angular position of the fitting 45 relative to the seatbelt tongue 40. A magnet 43 is provided on the fitting 43 for this purpose, which can be seen in FIG. 6 in a rear view that typically faces an occupant.

A coil 42 on the seatbelt tongue 40, which is covered by a plastic cover, serves to receive electrical energy from the seatbelt buckle 30 which can be connected in a simple manner to a vehicle network via a cable 34. The inductive transmission from the seatbelt buckle 30 takes place by means of a coil 32 of the seatbelt buckle 30, which can be seen in FIG. 7, to the coil 42 in the seatbelt tongue 40. The transmitted electrical energy can be used to operate the sensor 41 which in this embodiment detects the changes in the magnetic field from the rotation of the fitting 45 by the relative movement of the magnet 43.

FIG. 8 shows the corresponding seatbelt device 10 with a seatbelt tongue 40 inserted in the seatbelt buckle 30 so that the two coils 32, 42 are arranged next to one another. The electrical energy transmitted by the seatbelt buckle 30 is used to operate the sensor 41 on the seatbelt tongue. The rotational angular position detected by the sensor 41 can be transmitted together with current from the coil 42 by means of a cable connection 25 to the diagonal belt portion 20. An electronic module 24 is provided in the diagonal belt portion 20, is operated with the current from the coil 42, and can transmit the detected rotational angular position or a corresponding categorization by a radio link, for example Bluetooth®, to other vehicle systems.

Figure 9A:
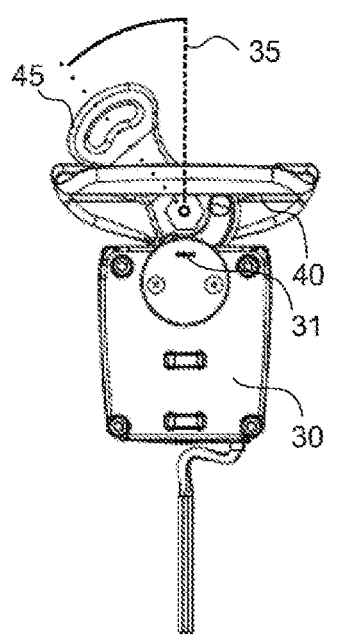
FIG. 9 shows fittings on inserted belt buckles in different rotational angular positions.
Figure 9B:
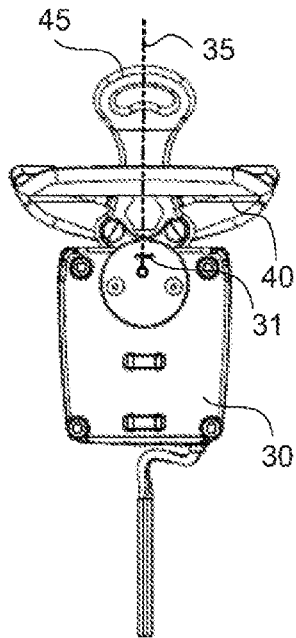
Figure 9C:
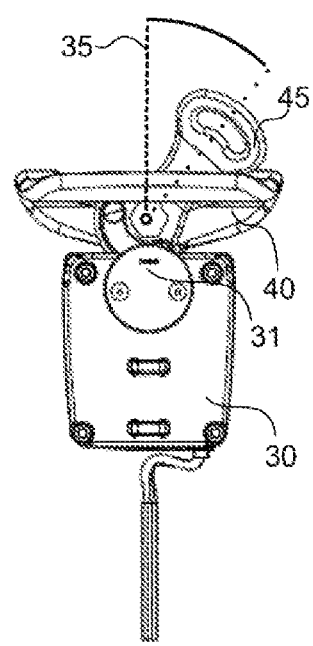

FIG. 9 shows multiple inserted seatbelt tongues 40, wherein the rotational angular position of the fitting 45 mounted rotatably on the seatbelt tongue 40 for the affixing of a diagonal belt portion 20 is detected with a sensor 31 on the seatbelt buckle 30. The rotational angular positions of the fittings 45 in FIG. 9 serve only for illustration and are shown in the stop positions in FIGS. 9a and 9c, wherein FIG. 9b shows a central position. In the central position, the fitting 45 is aligned parallel to the insertion axis 35 of the seatbelt buckle 30. For example, the value 90° can be assigned to this rotational angular position.

FIG. 9a shows, for example, a fitting 45 which is approximately 35° to the insertion axis 35. For illustration, it is assumed that a backrest of a vehicle seat and, according to the representation in FIG. 9a, a seat surface extends on the left of the seatbelt buckle 30. In principle, however, a reverse arrangement would also be conceivable. The fitting 45 is therefore inclined relative to a backrest in FIG. 9a. A negative sign is assigned to this direction of rotation so that the rotational angular position in FIG. 9a can be assigned, for example, a value of approximately 55°. Such a value can, for example, occur when the diagonal belt section 20 is not only guided behind the back of an occupant, but also behind the backrest. The seatbelt device 10 would transmit a signal corresponding to the category of the first angular range, which can be assigned to a "diagonal belt portion on the back."

In FIG. 9c, the fitting 45 is rotated approximately 35° relative to the insertion axis 35 in the other direction, i.e., in the direction of a seat surface. Accordingly, a positive sign is provided for the direction of rotation so that, for example, a value of 135° can be assigned to the rotational angular position of the fitting 45. Such a large angle can typically only be achieved if the diagonal belt portion is pushed far below the shoulder of an occupant, so that the seatbelt device 10 would accordingly transmit a signal of the category of the third angular range, which can be assigned to a "diagonal belt portion on the abdomen and the shoulder.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt device for a motor vehicle, having comprising:
   a diagonal belt portion,
   a lap belt portion, which
   are each connected to a belt retractor that can be fastened to the vehicle,
   a seatbelt buckle which can be fastened to the vehicle, and
   a seatbelt tongue that can be locked to the seatbelt buckle and to which the lap belt portion is fastened by an end, wherein
   the diagonal belt portion is fastened to a fitting by one end, wherein the fitting is rotatably connected to the seatbelt tongue, and
   at least one sensor is provided which is configured to detect a rotational angular position of the fitting with respect to the seatbelt tongue or the seatbelt buckle.

2. A seatbelt device according to claim 1, wherein at least one magnet is arranged on the fitting.

3. A seatbelt device according to claim 1, wherein the at least one sensor is a Hall sensor.

4. A seatbelt device according to claim 1, wherein the at least one sensor is arranged on the seatbelt buckle.

5. A seatbelt device according to claim 1, wherein the at least one sensor is arranged on the seatbelt tongue.

6. A seatbelt device according to claim 1, wherein the seatbelt buckle or the seatbelt tongue has a coil for transmitting electrical energy.

7. A seatbelt device according to claim 1, wherein a cable connection is provided between the seatbelt tongue and an electronic module in the diagonal belt portion, wherein the seatbelt device is configured to transmit a sensor signal of the sensor via the cable connection to the electronic module in the diagonal belt portion.

8. A seatbelt device according to claim 1, wherein the fitting is non-detachably connected to the seatbelt tongue.

9. A seatbelt device according to claim 1, wherein the at least one sensor is arranged on the fitting.

10. A detection method for detecting incorrect use of a diagonal belt portion of a seatbelt device, comprising the steps of:
    providing the seatbelt device having;
    the diagonal belt portion,
    a lap belt portion, which
    are each connected to a belt retractor that can be fastened to the vehicle,
    a seatbelt buckle which can be fastened to the vehicle, and
    a seatbelt tongue that can be locked to the seatbelt buckle and to which the lap belt portion is fastened by an end, and
    the diagonal belt portion is fastened to a fitting by one end, wherein the fitting is rotatably connected to the seatbelt tongue,
    at least one sensor is provided which is configured to detect the rotational angular position of the fitting with respect to the seatbelt tongue or the seatbelt buckle,
    detecting the rotational angular position of the fitting relative to the seatbelt tongue or the seatbelt buckle,
    categorizing the rotational angular position as one the following angular ranges:
    a first angular range;
    a second angular range; or
    a third angular range; and
    transmitting a signal depending on the categorized angular range.

11. A detection method according to claim 10, further comprising the steps of:
    detecting an insertion of the seatbelt tongue into the seatbelt buckle,
    storing the rotational angular position when the insertion has been detected as an adapted basic angular position, and
    categorizing the rotational angular position in the third angular range if the detected rotational angular position is greater than the basic angular position plus 5°.

12. A detection method according to claim 11, wherein the rotational angular position when the insertion has been detected is stored as the adapted basic angular position only when the rotational angular position has a minimum magnitude.

13. A detection method according to claim 11, wherein the adapted basic angular position is reset when the seatbelt tongue is removed from the seatbelt buckle.

* * * * *